Patented Sept. 15, 1936

2,054,243

UNITED STATES PATENT OFFICE 2,054,243

MOLDING COMPOSITIONS

Arthur B. Cowdery, Needham, Mass., assignor to The Barrett Company, New York, N. Y., a corporation of New Jersey No Drawing. Application January 25, 1934, Serial No. 708,252

3 Claims. (Cl. 106—23)

This invention relates to the manufacture of molded articles, and is directed to the provision of molding compositions adapted for general use in cold molding operations and particularly in the production of molded electrical insulation.

The primary object of the invention lies in the provision of molding compositions utilizing resinous binders having sufficient binding power to facilitate the production from inexpensive materials of satisfactory insulating substances of such characteristics as to permit shaping and molding in the cold state. Cold molding has the advantage that a comparatively large production may be obtained from a relatively small number of molds principally for the reason that the molded article need not be cooled in the molds. Hot molding necessarily includes the use of costly and more or less complicated equipment together with comparatively high-grade workmanship. On the other hand, while cold molding does not require so much operating skill, the problem in cold molding lies principally in the selection of materials.

The invention is directed to the provision of molding compositions comprising certain resins, coal tar pitches and inert filling materials, and in the preferred forms of the invention, resins and coal tar pitches as the principal binding agents compounded with rubber and filling materials in such manner as to provide compositions from which electrical insulation of high efficiency and durability may be cold molded.

The resins which are preferably employed are the resinous products commonly known as "paracoumarone resin", made by polymerizing resin-forming constituents contained in solvent naphtha, drip oil and other coal and coal-tar distillates. Similar resins may be obtained by polymerizing resin-forming constituents in certain cracked or hydrogenated petroleum distillates obtained from petroleum and/or natural gas. In the specification and claims I refer to all such resins as "cumarone resins".

While the invention contemplates the use of cumarone resins generally, it is preferred to employ certain resins having melting points ranging generally from about 60° C. to about 142° C. The utilization of two grades of cumarone resins is preferred, one having a melting point varying from 100° C. to about 115° C., and a second grade of light color and having a melting point ranging from about 127° C. to around 142° C.

While the invention comprehends the use of low to medium melting coal tar pitches generally, particularly effective results have been obtained with pitches having melting points ranging from about 30° C. to 110° C. Of the various pitches falling within the scope of the invention, it has been found that three grades are particularly suitable, and of such three grades, the pitch having the highest melting point and highest free carbon content is most adapted for the purposes of the invention.

One of the particularly suitable pitches is a comparatively low melting pitch having a melting point varying from about 32 to 35° C., and having a free carbon content of not less than about 13% and usually running between 14 to 16%. A second specific example of a pitch well adapted for use as a binding material is a coal tar distillation residue having a somewhat higher melting point, but still of such character that it may be considered as a low melting pitch. Such pitch residue has a melting point which may vary from 91 to 95° C., and has a higher free carbon content which is generally around 28%.

Of the various grades of coal tar pitch contemplated for use according to the invention, it is preferred to employ a pitch having a somewhat higher melting point and also a higher free carbon content than either of the two examples previously mentioned. The coal tar pitch preferred for use as a binder has, in most cases, a melting point of substantially 104° C. and not generally less than 100° C. nor substantially in excess of 107° C. The free carbon content thereof is about 40%. According to one method by which such a pitch or coal tar residue may be obtained, a coal tar containing about 20% of "free carbon" or matter insoluble in hot benzol and toluol is distilled for about 12 hours, or until about 25 or 30% by weight of the volatile matter has been removed, whereupon a residue or pitch will be obtained which contains about 40% free carbon and has a melting point of about 104° C. and a specific gravity of about 1.3. This particular product is further described in my U. S. Patent No. 1,820,444, of August 25, 1931.

The "free carbon" noted in the above examples, refers to constituents which have been produced in situ and which are insoluble in benzol. By reference to benzol insoluble constituents of coal tar distillation which have been produced in situ it is intended to define those constituents, commonly known as "free carbon", which have been formed in the coal tar during the distillation reaction by which the material is produced as distinguished from free carbon extraneously formed and added to the material.

In those preferred embodiments of the invention where rubber is a constituent of the molding compositions, any grade of rubber may be utilized. In some instances, it may be desirable to incorporate new rubber, but in most cases it is preferred to employ reclaimed rubber as the latter is generally sufficient for the purposes of the invention, thus reducing the cost of the ultimate product. Scrap rubber may also be used.

Various types of fillers which are well known in the art are suitable for the purposes of the invention, such fillers as asbestos, wood flour, whiting, clays, plaster of Paris, slate flour, infusorial earth, cotton linters, sawdust, corncobs, oat hulls, etc., being satisfactory.

While the proportions of the various ingredients may vary considerably, particularly desirable products have been obtained from the following compositions.

*Example I*

| | Per cent |
|---|---|
| Cumarone resin | 26 |
| Coal tar pitch | 26 |
| Infusorial earth | 13 |
| Cotton linters | 17.5 |
| Asbestine | 17.5 |

In the above composition, the cumarone resin may be any resin, but is desirably one having a melting point within the range 100–142° C., and is preferably one of the two above mentioned grades. It is also preferred to employ the coal tar pitch mentioned above in connection with my Patent No. 1,820,444, although other pitches generally may be substituted, and particularly it is advantageous to incorporate the aforementioned coal tar pitches having melting points ranging from not less than about 30° C. to not more than 110° C.

The composition of Example I may be made up by grinding the resin and pitch separately, then mixing the two thoroughly in the cold, and thereafter incorporating the filler. The product may be further ground if desired, and is then ready to be charged into the molds. Mixture of the ingredients of the above composition may also be brought about by heating the resin and pitch to fusion temperature, and incorporating the filler into the fused mass. On cooling, the mixture is rolled out and ground down to say 10–60 c. even 100 mesh. Whichever the mode of mixing, molding under pressure may be effected at normal temperatures, this being one of the outstanding advantages of the invention.

The proportions of resin and pitch may vary over a considerable range depending upon the use to which the product is to be put and upon the percentage of binding material desired. The resin content may vary from about 5 to about 40%, and the proportion of pitch may range from about 5 to about 35%. Usually, however, the combined resin-pitch content is not preferably less than 30% nor greater than 65%.

Specific examples of improved compositions including rubber as a principle ingredient are as follows:

*Example II*

| | Per cent |
|---|---|
| Cumarone resin | 9 |
| Coal tar pitch | 9 |
| Reclaimed rubber | 9 |
| Whiting | 73 |

*Example III*

| | Per cent |
|---|---|
| Cumarone resin | 11 |
| Coal tar pitch | 10 |
| Reclaimed rubber | 10 |
| Suprex clay | 10 |
| Slate Flour | 43 |
| Infusorial earth | 13 |
| Carbon black | 2 |
| Paraffine | 1 |

*Example IV*

| | Per cent |
|---|---|
| Cumarone resin | 7 |
| Coal tar pitch | 14 |
| Reclaimed rubber | 8 |
| Paraffine | 1 |
| Magnesium oxide | 2 |
| Plaster of Paris | 68 |

The principal constituents of the compositions set forth in Examples II, III and IV are cumarone resin, coal tar pitch and rubber, preferably reclaimed rubber. The resin may be either the high or the low melting resins mentioned above or any other suitable resin. As in the case of the composition of Example I, various pitches may be employed, although it is preferred to use higher melting point pitch, that is having a melting point range from 100–107° C., and particularly the grade melting at 104° C. and containing about 40% free carbon. In these compositions containing rubber, a relatively small amount of paraffine may be used to advantage to improve molding properties, prevent adhesion to the molds, and give an improved surface finish.

While in most cases it has been found advantageous to utilize the resin, pitch and rubber in approximately the proportions noted in the examples, the content of each of these principal ingredients may vary from about 5 to about 25%, although it is preferred to limit the total content of these materials to about 45%.

Ingredients of molding compositions such as disclosed above may be mixed as follows. Individual components are powdered, and the powders thoroughly blended to form a mix ready for pressing. According to another procedure, the inert fillers in powdered form and the fusible resinous or other binding agents in relatively coarse form are mixed under conditions whereby the fusible binding material melts and coats the particles of the inert filler. The mix is then cooled and ground to produce a powder of inert filler particles coated with a film of binder. In this second method, the mixing may be done on the heated rolls of a rubber mill, or in machines of the internal mixer type.

A molding mixture containing rubber as in the above examples may also be prepared by breaking down the rubber and the resin or the pitch in a suitable mill or masticator and then adding the third ingredient, whether pitch or resin, together with the filler. When the mass is cooled, it is rolled out in sheets, and when ground to a suitable degree of fineness is ready for molding in the cold state.

In most instances, particularly where rubber is included as an ingredient, it is desirable to subject the final products to a heat treatment by baking at a temperature of about 100° C. for 12 to 15 hours to increase the hardness of the moldings.

I claim:
1. A molding composition comprising cumarone resin, coal tar pitch, and rubber in approximately equal quantities, together with filling material.

2. A molding composition comprising 7-11% cumarone resin, 9-14% coal tar pitch, 8-10% rubber, and filling material.

3. A molding composition comprising 7-11% cumarone resin having a melting point not substantially less than about 100° C. and not substantially above about 142° C., 8-10% rubber, 9-14% coal tar pitch having a free carbon content of about 40% and a melting point of about 104° C., and filling material.

ARTHUR B. COWDERY.